No. 763,015. PATENTED JUNE 21, 1904.
J. NORTHROP.
FILLING DETECTING MEANS FOR LOOMS.
APPLICATION FILED APR. 15, 1904.
NO MODEL.

Witnesses,
Edward F. Allen.
S. Wm. Lutton.

Inventor,
Jonas Northrop,
by Crosby & Gregory
Attys.

No. 763,015.                                                   Patented June 21, 1904.

UNITED STATES PATENT OFFICE.

JONAS NORTHROP, OF HOPEDALE, MASSACHUSETTS, ASSIGNOR TO THE DRAPER COMPANY, OF HOPEDALE, MASSACHUSETTS, A CORPORATION OF MAINE.

FILLING-DETECTING MEANS FOR LOOMS.

SPECIFICATION forming part of Letters Patent No. 763,015, dated June 21, 1904.

Application filed April 15, 1904. Serial No. 203,260. (No model.)

*To all whom it may concern:*

Be it known that I, JONAS NORTHROP, a citizen of the United States, residing in Hopedale, in the county of Worcester and State of Massachusetts, have invented an Improvement in Filling-Detecting Means for Looms, of which the following description, in connection with the accompanying drawings, is a specification, like figures on the drawings representing like parts.

The usual filling detector or fork of a loom is pivotally mounted on a slide longitudinally movable in a stand or guide secured to the breast-beam, the lay having an upright grid or grating thereon back of the path of the filling as laid by the shuttle, the tines of the fork engaging the filling between the bars of the grid as the lay beats up. It is of great importance that the tines of the fork be very accurately positioned opposite the spaces in the grid, in order that the tines may pass into such spaces on the beat up of the lay when the filling breaks or is exhausted; but it often happens that through wear, some looseness of parts, or improper movement thereof the tines will strike the bars of the grid. If the tines strike the grid, the fork will be tilted and operate just as if the filling were present, and if this occurs at a time when the filling is absent the loom will continue weaving, and inasmuch as the filling is either broken or exhausted a bad thin place will be made in the cloth. The fork and grid do not always remain in proper relative working position opposite each other, largely because the blows of the picker-sticks against the lay tend to make it move sidewise, and pressure is thereby brought upon the bearings in such a way as to cause lateral movement of the lay and of the grid mounted thereon.

My present invention has for its object the production of means to absolutely insure the accurate positioning of the fork-tines with relation to the grid, so that any chance of engagement between such parts will be completely obviated.

The various novel features of my invention will be fully described in the subjoined specification and particularly pointed out in the claims appended thereto.

Figure 1:
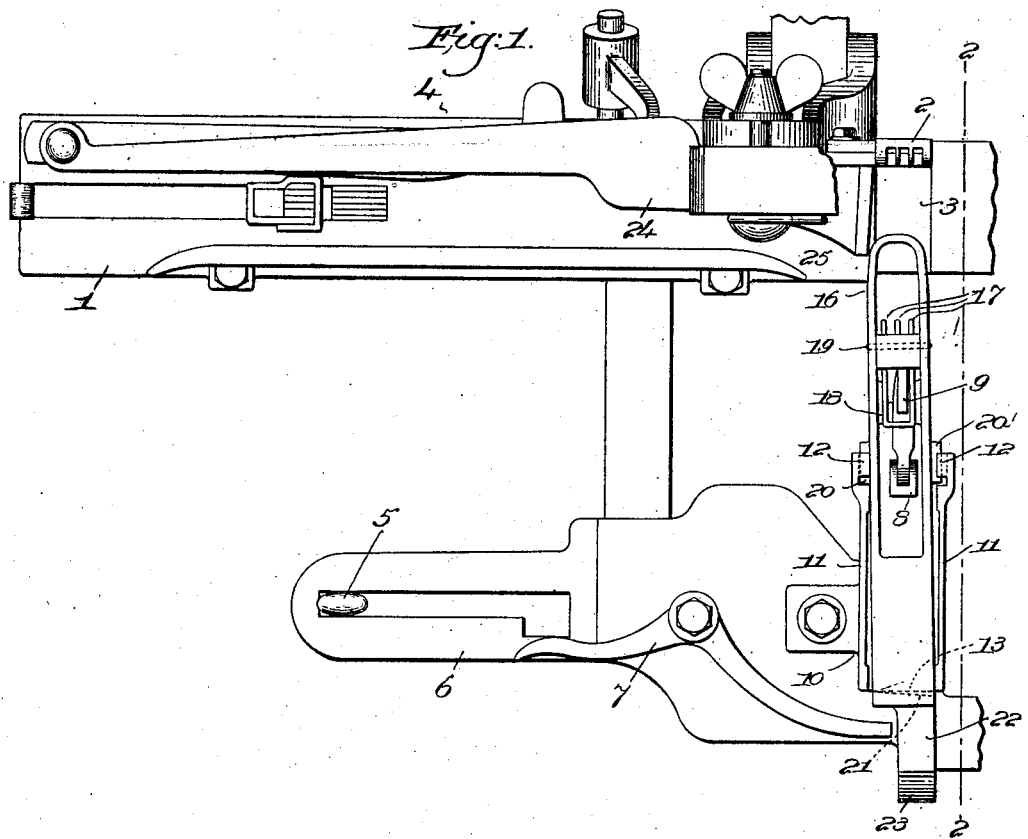
Figure 2:
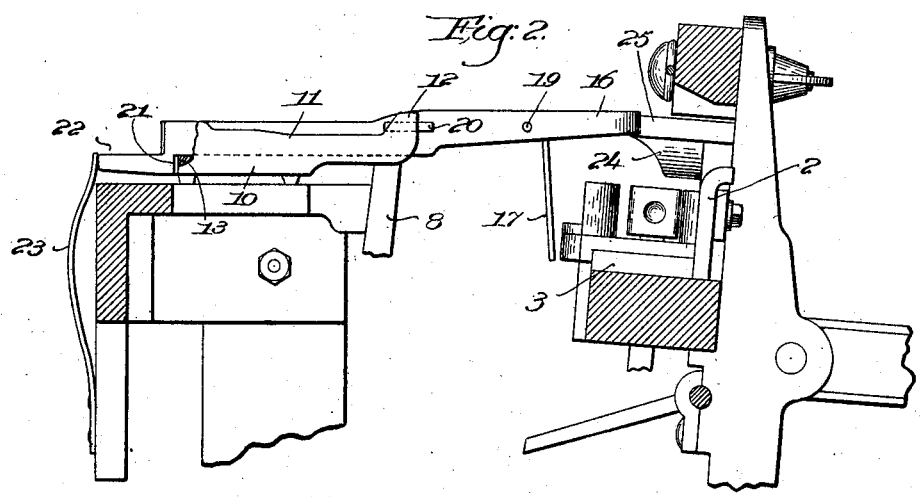

Figure 1 is a top or plan view of a sufficient portion of the filling-detecting means of a loom to be understood with one form of my invention embodied therein; and Fig. 2 is a transverse sectional view of the apparatus on the line 2 2, Fig. 1, looking toward the left, a part of the stand being broken out.

The lay 1, having a fork-gird 2 thereon of usual construction and located behind the shuttle-raceway at the rear end of the transverse slot 3, the shuttle-box 4, Fig. 1, near the mouth of which the grid is located, the shipper 5 and its notched holding-plate 6, the knock-off lever 7, fulcrumed on the breast-beam, and the weft-hammer 8, having a hook 9, pivotally connected therewith, may be and are all of well-known construction.

The stand 10, rigidly secured to the breast-beam, has upturned longitudinal sides 11 and inturned overhanging ears 12, Fig. 1, at its inner end, and at its outer end the stand has a transverse abutment 13, which serves to stop the inward movement of the fork-slide and also to provide a fulcrum about which the slide may swing horizontally, as will be described.

The fork-slide 14, mounted to slide longitudinally on the stand between the sides 11 thereof, is open at 15, as usual, to permit the reciprocation of the head of the weft-hammer with its hook 9, and rearwardly the slide is continued to form an elongated loop-like extension 16. (See Fig. 1.) As shown in Fig. 2, said extension is at such a height that it will pass over the top of the grid 2 as the lay beats up.

A filling-fork of suitable construction having tines 17 and a loop-like tail 18 is fulcrumed at 19 on the slide between the sides of the extension 16, as clearly shown, the tines being adapted to feel for the filling between the bars of the grid as the lay beats up in usual manner. Lateral lugs 20 on the fork-slide extend beneath the ears 11 of the stand to prevent any tendency of the slide to lift. Usually the slide is fitted to slide easily in the stand without any lateral clearance or play, and the stand is adjusted on the breast-beam to bring the fork-tines 17 in front of the spaces in the grid, so that the tines can enter the same on the beat-up. In my present invention, however, the distance between the sides of the stand is made considerably greater than the outside width of the fork-slide, so that the latter has considerable lateral movement therein.

The slide near its outer end has a transverse downturned shoulder 21, which is inclined with relation to the longitudinal center of the slide, as shown in Fig. 2 by dotted lines, the inclination being somewhat exaggerated, the shoulder depending in front of the abutment 13 of the stand. A forward extension 22 on the outer end of the slide is offset from the center, as clearly shown in Fig. 1, and the slide-returning spring 23 bears against the end of the extension. Owing to the inclination of the shoulder 21, the abutment 13 acts as a fulcrum about which the slide may rock laterally, and the spring acts to normally swing the slide to the left, viewing Fig. 1, so that its longitudinal axis is thrown off center or at an angle to the longitudinal axis of the stand. At such time the fork-tines 17 will not be properly positioned with relation to the grid; but I have provided means to act upon the slide and move it laterally against the action of the spring 23 as the lay beats up, the slide being thereby moved to bring the fork-tines into accurate position in front of the spaces between the bars of the grid.

The top or cover plate 24 of the shuttle-box is herein shown as prolonged at its inner end to present a cam 25, which engages the adjacent side of the slide extension 16 as the lay beats up, the cam being so shaped and positioned that as it acts upon the slide the latter will be swung laterally on the abutment 13 as a fulcrum and longitudinally centered.

Of course the spring maintains the extension 16 against the cam 25 as the latter wipes along the side of the extension, so that the slide must be positioned strictly in accordance with the shape and location of the cam.

When the lay swings back, the slide is released by the cam and returned to non-centered position by the spring, as shown in Fig. 1.

My invention is not restricted to the precise construction and arrangement shown and described herein, for, so far as I am aware, it is broadly new to provide intermittently-operating means to positively and accurately position the filling-fork relatively to the grid, and accordingly various changes and modifications may be made by those skilled in the art without departing from the spirit and scope of my invention.

Having described my invention, what I claim as new, and desire to secure by Letters Patent, is—

1. In a loom, a lay having a grid, a filling-fork, its slide, a stand therefor, and intermittingly-operating means to coöperate with the slide and thereby accurately position the fork with relation to the grid.

2. In a loom, a lay having a grid, a filling-fork, its slide, a stand therefor having a fulcrum on which the slide may swing laterally, and means operative on the forward beat of the lay to swing the slide on its fulcrum and thereby accurately position the fork with relation to the grid.

3. In a loom, a lay having a grid, a filling-fork, its slide, a stand therefor, and means mounted on the lay and operative on the forward beat thereof to engage and move the slide laterally in the stand to thereby accurately position the fork with relation to the grid.

4. In a loom, a lay having a grid, a filling-fork, its slide, a stand therefor, having a fulcrum at its outer end on which the slide may swing laterally, a spring to act upon the slide and throw it off the longitudinal axis of the stand, and means operative on the forward beat of the lay to engage the stand and swing it on its fulcrum against the action of the spring, to accurately present the tines of the fork opposite the spaces of the grid.

5. In a loom, a lay having a grid, a filling-fork, its slide, a stand in which the slide is longitudinally movable and also having a limited lateral swinging movement therein, and means to coöperate with and laterally position the slide as the lay beats, to thereby insure the passage of the tines of the fork through the spaces of the grid.

6. In a loom, a lay having a fork-grid, a filling-fork and its slide, and a stand in which the slide is laterally movable, a spring to return the slide and acting thereon at one side of its longitudinal axis, to normally offset the fork from its proper position with relation to the grid, and means on the lay to engage the slide on the forward beat and move said slide laterally against the action of the spring to insure the accurate position of the fork relatively to the grid.

7. In a loom, a lay having a fork-grid, a filling-fork and its slide, a stand for and in which the slide is movable laterally, and means mounted on the lay and operative on the forward beat thereof to engage the side of the slide and insure thereby the accurate position of the fork relatively to the grid.

8. In a loom, a lay having a fork-grid, a filling-fork and its slide, the latter having a depending, transverse and oblique shoulder at its outer end and a longitudinal extension offset from the longitudinal center of the slide, a stand for and in which the slide is laterally movable, said stand having a fulcrum-abutment for the shoulder of the slide, a spring to engage the slide extension and swing it laterally off center, and means on the lay to engage the inner end of the slide and swing it into longitudinally central position as the lay beats up.

9. In a loom, a lay having a fork-grid, a filling-fork and its slide, the latter having a rearward extension above the path of the top of the grid, a stand for the slide, means to normally maintain the latter out of longitudinal center on the stand, and a cam on the lay to engage the side of the rearward extension of the slide on the forward beat and longitudinally center the slide.

10. In a loom, a lay having a grid, a filling-fork, and means to guide the latter on the forward beat of the lay, and thereby accurately position the fork-tines opposite the openings in the grid irrespective of any lateral displacement of the grid.

In testimony whereof I have signed my name to this specification in the presence of two subscribing witnesses.

JONAS NORTHROP.

Witnesses:
GEORGE OTIS DRAPER,
ERNEST W. WOOD.